(12) United States Patent
Kamiya (10) Patent No.: US 11,375,134 B2
(45) Date of Patent: Jun. 28, 2022

(54) VEHICLE MONITORING SYSTEM

(71) Applicant: Koito Manufacturing Co., Ltd., Tokyo (JP)

(72) Inventor: Misako Kamiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 286 days.

(21) Appl. No.: 16/813,828

(22) Filed: Mar. 10, 2020

(65) Prior Publication Data

US 2020/0304700 A1    Sep. 24, 2020

(30) Foreign Application Priority Data

Mar. 19, 2019  (JP) .............................. JP2019-051491

(51) Int. Cl.
*H04N 5/235* (2006.01)
*B60Q 1/14* (2006.01)
*B60R 1/00* (2022.01)

(52) U.S. Cl.
CPC .............. *H04N 5/2354* (2013.01); *B60Q 1/14* (2013.01); *B60R 1/002* (2013.01)

(58) Field of Classification Search
CPC ........ H04N 5/2354; B60Q 1/14; B60Q 1/143; B60Q 1/0023; B60R 1/002; B60R 2300/103
See application file for complete search history.

(56) References Cited

U.S. PATENT DOCUMENTS

| | | | | |
|---|---|---|---|---|
| 2011/0102664 | A1* | 5/2011 | Chuang | G03B 42/00 348/E5.022 |
| 2015/0138324 | A1* | 5/2015 | Shirai | H04N 13/296 348/47 |
| 2016/0229331 | A1* | 8/2016 | Adachi | B60Q 1/143 |
| 2016/0264042 | A1* | 9/2016 | Ito | B60Q 1/143 |
| 2017/0234976 | A1* | 8/2017 | Grauer | B60Q 1/14 356/5.04 |
| 2017/0270381 | A1* | 9/2017 | Itoh | B60Q 1/143 |
| 2017/0330464 | A1* | 11/2017 | Yoo | B60Q 1/525 |
| 2018/0031200 | A1* | 2/2018 | Park | F21S 41/141 |
| 2018/0170240 | A1 | 6/2018 | Wama et al. | |
| 2019/0208111 | A1* | 7/2019 | Wendel | H04N 5/2357 |
| 2019/0320106 | A1* | 10/2019 | Tatara | B60R 11/04 |

FOREIGN PATENT DOCUMENTS

| | | |
|---|---|---|
| JP | 2016-150688 A | 8/2016 |
| JP | 2018-086913 A | 6/2018 |

* cited by examiner

*Primary Examiner* — Lin Ye
*Assistant Examiner* — John H Morehead, III
(74) *Attorney, Agent, or Firm* — Venjuris, P.C.

(57) ABSTRACT

A vehicle monitoring system includes a lamp unit that includes a first light source configured to emit light that forms a first light distribution area on a virtual vertical screen disposed at a predetermined distance from a vehicle, and a second light source configured to emit light that forms a second light distribution area having a luminance higher than that of the first light distribution area on the virtual vertical screen, and forms a predetermined light distribution pattern on the virtual vertical screen by the first light distribution area and the second light distribution area; a visible light camera that captures a periphery of the vehicle; and a controller configured to control at least one of an emission timing of the second light source or an image capturing timing of the visible light camera.

19 Claims, 5 Drawing Sheets

TURN-ON TIMING

IMAGE CAPTURING TIMING

VEHICLE MONITORING SYSTEM

CROSS-REFERENCE TO RELATED APPLICATIONS

This application is based on and claims priority from Japanese Patent Application No. 2019-051491, filed on Mar. 19, 2019, with the Japan Patent Office, the disclosure of which is incorporated herein in its entirety by reference.

TECHNICAL FIELD

The present disclosure relates to a vehicle monitoring system.

BACKGROUND

A vehicle equipped with a visible light camera that monitors a traveling direction is known as disclosed in, for example, Japanese Patent Laid-Open Publication No. 2018-086913.

SUMMARY

When driving at night, light of a vehicle headlamp is used for capturing by a visible light camera. Image capturing conditions of the visible light camera are adjusted in response to the brightness of the vehicle headlamp, but the vehicle irradiation area of the headlamp includes a strongly irradiated area and a weakly irradiated area. Therefore, it is difficult to adjust the image capturing conditions of the visible light camera to be suitable for the entire area of the field angle of the visible light camera. When the image capturing conditions of the visible light camera are not suitable, over exposure or under exposure may occur in the image capturing result of the visible light camera.

Therefore, the present disclosure is to provide a vehicle monitoring system capable of obtaining a favorable image capturing result of a visible light camera.

A vehicle monitoring system according to an aspect of the present disclosure includes: a lamp unit that includes a first light source configured to emit light that forms a first light distribution area on a virtual vertical screen disposed at a predetermined distance from a vehicle, and a second light source configured to emit light that forms a second light distribution area having a luminance higher than that of the first light distribution area on the virtual vertical screen, the first light distribution area and the second light distribution area being combined to form a predetermined light distribution pattern on the virtual vertical screen; a visible light camera configured to capture a periphery of the vehicle including an area where the light distribution pattern is formed; and a controller configured to control at least one of an emission timing of the second light source or an image capturing timing of the visible light camera such that the visible light camera performs an image capturing while only the first light source emits light.

According to an aspect of the present disclosure, it is possible to provide a vehicle monitoring system capable of obtaining a favorable image capturing result of a visible light camera.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure will be described with reference to the drawings. Descriptions of members having same reference numbers as members described already in description of the present embodiment will be omitted for convenience of explanation. Further, dimensions of members illustrated in the drawings may be different from actual dimensions of the members for convenience of explanation.

Figure 1:
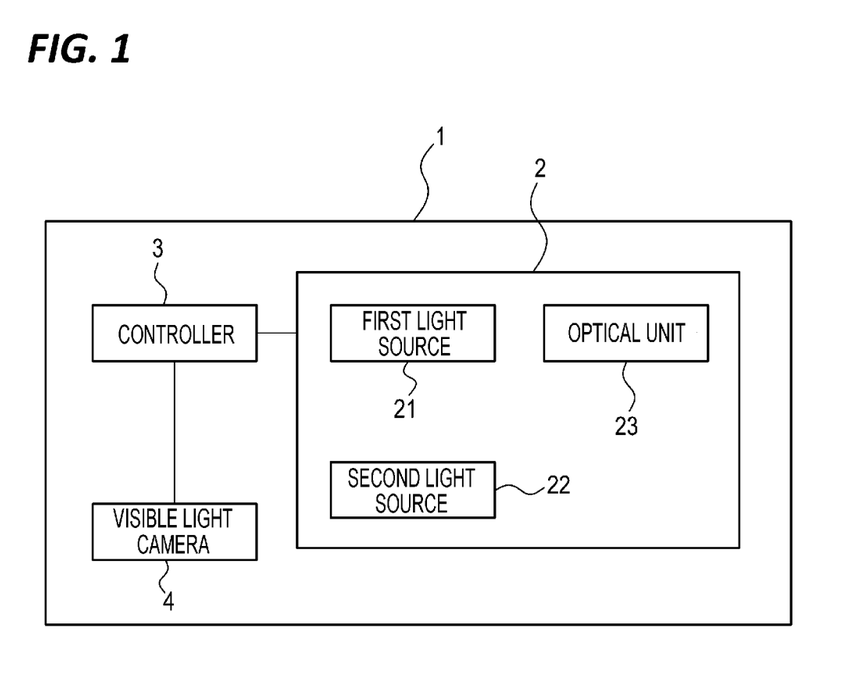
FIG. 1 is a block diagram of a vehicle lamp according to an embodiment (hereinafter, referred to as a "present embodiment") of the present disclosure.

FIG. 1 is a block diagram of a vehicle lamp 1 according to the present embodiment. The vehicle lamp 1 is an example of a vehicle monitoring system of the present disclosure. The vehicle lamp 1 is configured to be mounted on a vehicle and to irradiate the periphery of the vehicle with light. For example, the vehicle lamp 1 is a vehicle headlamp provided on a front side of the vehicle and configured to irradiate the front of the vehicle with light. Hereinafter, the vehicle headlamp will be described as an example of the vehicle lamp 1.

The vehicle lamp 1 includes a lamp unit 2 and a controller 3. The lamp unit 2 is configured to irradiate the front of the vehicle with light based on a turn-on control signal received from the controller 3. The light emitted from the lamp unit 2 forms a predetermined light distribution pattern in front of the vehicle.

The lamp unit 2 includes a first light source 21, a second light source 22, and an optical unit 23. The light emitted from the first light source 21 is emitted toward the front of the vehicle via the optical unit 23 to form a predetermined light distribution area in front of the vehicle. The light emitted from the second light source 22 is emitted toward the front of the vehicle via the optical unit 23 to form a predetermined light distribution area in front of the vehicle. These light distribution areas are combined to from a predetermined light distribution pattern. The predetermined light distribution pattern refers to, for example, a low beam light distribution pattern or a high beam light distribution pattern. The lamp unit 2 is configured such that the luminance of the light distribution area formed by the light from the second light source 22 (hereinafter, also referred to as a "light condensed portion") is higher than the luminance of the light distribution area formed by the light from the first light source 21 (hereinafter, also referred to as a "diffusion portion").

Each of the first light source 21 and the second light source 22 has, for example, one or more light emitting elements such as a light emitting diode (LED) or a laser diode (LD). The first light source 21 is controlled to be, for example, continuously turned ON or turned ON in a pulsed manner. The second light source 22 is controlled, for example, to be turned ON in a pulsed manner. The optical unit 23 has, for example, a projection lens, a reflector, and a movable shade. Emitting light from a light source is referred to as "turn-on."

The configuration of the lamp unit 2 is not limited to the above configuration. For example, the lamp unit 2 uses the common optical unit 23 for the first light source 21 and the second light source 22, but is not limited thereto. The lamp unit 2 may include a first optical unit corresponding to the first light source 21 and a second optical unit corresponding to the second light source 22.

Figure 2:
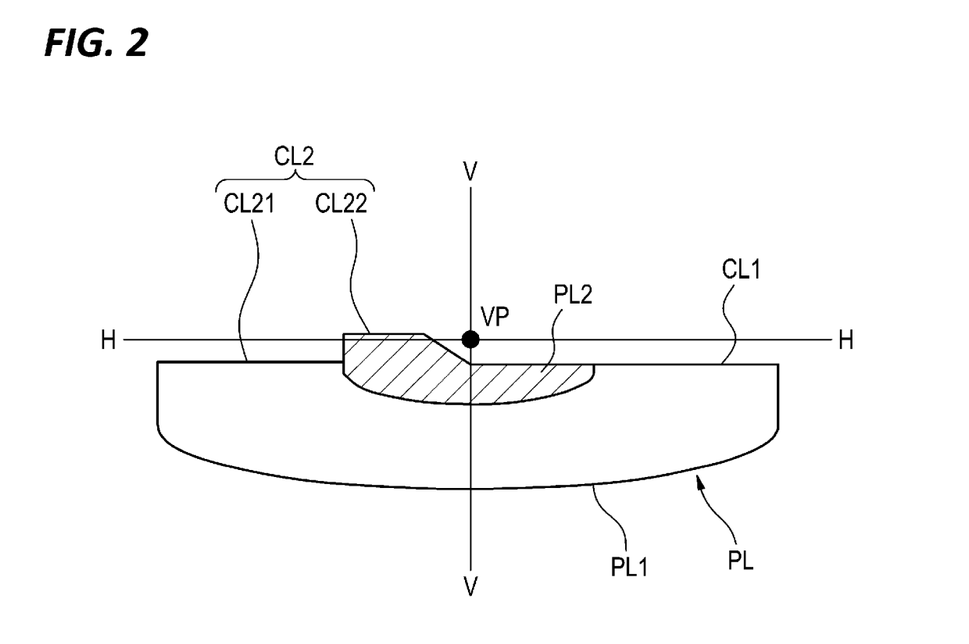
FIG. 2 is a drawing illustrating an example of a low beam light distribution pattern by the vehicle lamp according to the present embodiment.
Figure 3:
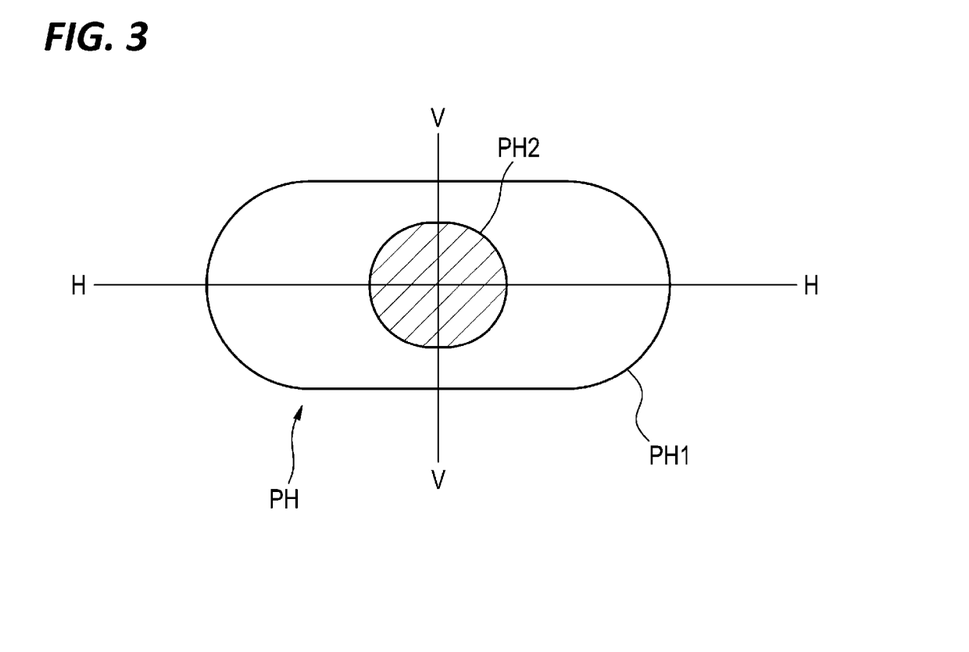
FIG. 3 is a drawing illustrating an example of a high beam light distribution pattern by the vehicle lamp according to the present embodiment.

A light distribution pattern formed by the lamp unit 2 will be described with reference to FIGS. 2 and 3. FIG. 2 illustrates an example of a low beam light distribution pattern PL by the vehicle lamp 1 according to the present embodiment. FIG. 3 illustrates an example of a high beam light distribution pattern PH by the vehicle lamp 1 according to the present embodiment. In FIGS. 2 and 3, a light distribution pattern formed on a virtual vertical screen disposed at a predetermined distance from a vehicle, for example, a position that is 25 m ahead of the vehicle, by the light irradiated to the front of the vehicle from the lamp unit 2 is transparently illustrated.

The low beam light distribution pattern PL and the high beam light distribution pattern PH have diffusion portions PL1 and PH1 formed by the light of the first light source 21, and light condensed portions PL2 and PH2 formed by the light of the second light source 22 and having luminance higher than that of the diffusion portions PL1 and PH1, respectively. The diffusion portions PL1 and PH1 are examples of the first light distribution area, and the light condensed portions PL2 and PH2 are examples of the second light distribution area.

The low beam light distribution pattern PL illustrated in FIG. 2 is a low beam light distribution pattern of a left side light distribution. The low beam light distribution pattern P1 has cut off lines CL1 and CL2 having different left and right steps on the upper edge. The cut off lines CL1 and CL2 have different left and right steps with V-V line passing through a vanishing point VP of the front direction of the lamp in the vertical direction and extend in the horizontal direction. An opposite lane side portion on the right side from the V-V line is formed as a lower cut off line CL1. An own lane side portion on the left side from the V-V line is formed as an upper cut off line CL2 that rises by one step through an inclined portion from the lower cut off line CL1. The cut off line CL2 has a cut off line CL21 formed by the diffusion portion and a cut off line CL22 formed by the light condensed portion. The cut off line CL21 is positioned lower than the cut off line CL22. In the low beam light distribution pattern PL, an elbow point that is an intersection point of the lower cut off line CL1 and the V-V line is positioned, for example, 0.5° to 0.6° below the vanishing point VP.

The light condensed portion PL2 of the low beam light distribution pattern PL forms the cut off lines CL1 and CL2 (CL22) at the center portion of the low beam light distribution pattern PL, and a light distribution area in the vicinity thereof. The diffusion portion PL1 of the low beam light distribution pattern PL forms the cut off lines CL1 and CL2 (CL21) that are positioned lower than the cut off line CL22 of the light condensed portion PL2, and extend in the left-right direction around the V-V line, and a light distribution area that spreads downward therefrom. Since the luminance of the diffusion portion PL1 is lower than that of the light condensed portion PL2, there is no steep luminance change in the vicinity of the cut off lines CL1 and CL21 of the diffusion portion PL1 compared to the vicinity of the cut off lines CL1 and CL22 of the light condensed portion PL2.

The diffusion portion PL1 is formed by, for example, projecting a light source image of the first light source 21 formed on a rear focal plane of a projection lens by the light from the first light source 21 reflected by the reflector of the optical unit 23 as a reverse projection image on the virtual vertical screen by the projection lens. The cut off lines CL1 and CL21 are formed by shielding a part of the light from the first light source 21 toward the projection lens by the movable shade.

The light condensed portion PL2 is formed by, for example, projecting a light source image of the second light source 22 formed on the rear focal plane of the projection lens by the light from the second light source 22 reflected by the reflector of the optical unit 23 as a reverse projection image on the virtual vertical screen by the projection lens. The cut off lines CL1 and CL22 are formed by shielding a part of the light from the second light source 22 toward the projection lens by the movable shade.

The high beam light distribution pattern PH illustrated in FIG. 3 has a shape obtained by extending the low beam light distribution pattern PL above the cut off lines CL1 and CL2. The diffusion portion PH1 of the high beam light distribution pattern PH is formed as a light distribution area that widens longer horizontally around the V-V line. The light condensed portion PH2 of the high beam light distribution pattern PH is formed as a light distribution area having a spot shape that slightly widens longer horizontally around the V-V line and is narrower than the diffusion portion PH1.

The diffusion portion PL1 is formed by projecting the light source image of the first light source 21 formed on the rear focal plane of the projection lens by the light from the first light source 21 reflected by the reflector as the reverse projection image on the virtual vertical screen by the projection lens.

The light condensed portion PH2 is formed by projecting the light source image of the second light source 22 formed on the rear focal plane of the projection lens by the light from the second light source 22 reflected by the reflector as the reverse projection image on the virtual vertical screen by the projection lens.

Returning to FIG. 1, the vehicle lamp 1 further includes a visible light camera 4. The visible light camera 4 is disposed, together with the lamp unit 2 and the controller 3, in a space formed by a housing having an opening on the front side of the vehicle and an outer lens attached to cover the opening of the housing. The visible light camera 4 is configured to capture the front of the vehicle based on an image capturing control signal received from the controller 3. When driving at night, the visible light camera 4 is configured to capture the front of the vehicle using light from the lamp unit 2. The visible light camera 4 is, for example, a camera that includes an image capturing device such as a charge-coupled device (CCD) or a complementary metal-oxide semiconductor (CMOS). The visible light camera 4 may be configured as a monocular camera, or as a stereo camera. The visible light camera 4 is configured to, when acquiring image data indicating the environment of the front of the vehicle, send the image data to the controller 3. The image data sent to the controller 3 is converted into vehicle surrounding information, and then, is used for controlling the lamp unit 2 and/or the visible light camera 4, or is sent to a vehicle controller that controls the vehicle.

The controller 3 is configured to control operations of the lamp unit 2 and the visible light camera 4. The controller 3 sends the image capturing control signal including image capturing timing information to the visible light camera 4 based on an image capturing instruction signal from the vehicle controller. The image capturing timing information includes information on a cycle and a period (exposure time) of capturing of the visible light camera 4. Further, the controller 3 sends the turn-on control signal including turn-on timing information to the lamp unit 2 based on a turn-on instruction signal from the vehicle controller. The turn-on timing information includes turn-on timing information of the first light source 21 and the second light source 22 of the lamp unit 2, and in a case of a pulsed turn-on, includes information on a cycle and a period of the pulsed turn-on.

Further, the controller 3 controls at least one of the turn-on timing of the second light source 22 or the image capturing timing of the visible light camera 4, such that the visible light camera 4 performs an image capturing while, among the light distribution pattern, only the diffusion portion is formed and the light condensed portion is not formed (i.e., only the first light source 21 is turned ON, and the second light source 22 is not turned ON).

The controller 3 is configured by an electronic control unit (ECU). The electronic control unit includes a computer system (e.g., SoC) including one or more processors and one or more memories, and an electronic circuit configured by active elements such as transistors and passive elements. The processor includes at least one of a CPU, an MPU, a GPU, and a TPU. The memory includes a ROM and a RAM. Further, the computer system may be configured by a non-Neumann computer such as an ASIC or an FPGA.

Further, in the present embodiment, the controller 3 is configured by single electronic control unit, but is not limited thereto. The controller 3 may be configured by two electronic control units, that is, an electronic control unit configured to control an operation of the lamp unit 2 and an electronic control unit configured to control an operation of the visible light camera 4.

Figure 4:
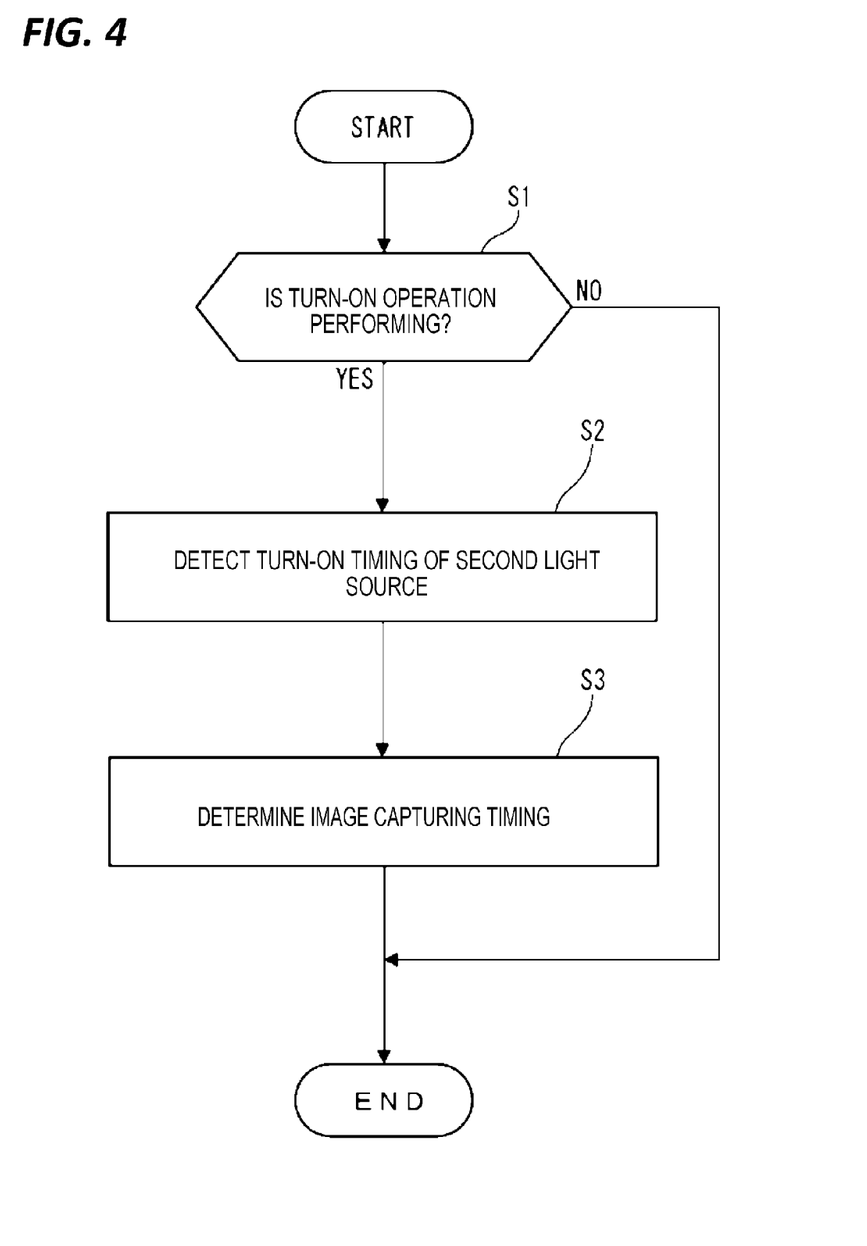
FIG. 4 is a flowchart executed by a controller of the vehicle lamp according to the present embodiment.

Subsequently, operation control of the lamp unit 2 and the visible light camera 4 executed by the controller 3 will be described. FIG. 4 is a flowchart executed by the controller 3 of the vehicle lamp 1 according to the present embodiment.

The controller 3 of the present embodiment is configured to control the image capturing timing of the visible light camera 4 based on the turn-on timing of the second light source 22, such that the visible light camera 4 performs an image capturing while only the first light source 21 of the first light source 21 and the second light source 22 is turned ON. In the flowchart, descriptions will be made based on an example in which the first light source 21 is continuously turned ON and the second light source 22 is turned ON in a pulsed manner.

As illustrated in FIG. 4, in step S1, when receiving an operation instruction signal of the visible light camera 4 from the vehicle controller, the controller 3 determines whether the lamp unit 2 is performing a turn-on operation. Here, the state in which the lamp unit 2 is performing the turn-on operation refers to a state in which the lamp unit 2 is forming a light distribution pattern by the light of the first light source 21 and the second light source 22. For example, when sending the turn-on control signal to the first light source 21 and the second light source 22, the controller 3 determines that the lamp unit 2 is performing the turn-on operation. When being configured to send a turn-on state signal indicating that the lamp unit 2 is turned ON to the controller 3, the controller 3 determines that the lamp unit 2 is performing the turn-on operation based on the receiving of the turn-on state signal. Further, the controller 3 may determine whether there is the turn-on operation of the lamp unit 2 or not based on the vehicle surrounding information from an external sensor acquired from the vehicle controller. When the determination result in step S1 is NO, the control is ended.

When the determination result in step S1 is YES, the controller 3 detects the turn-on timing (cycle and time of the pulsed turn-on) of the second light source 22 (step S2). For example, the controller 3 detects the turn-on timing of the second light source 22 based on the turn-on timing information included in the turn-on control signal sent to the lamp unit 2. When being configured to send the pulsed turn-on state signal indicating that the second light source 22 is in the pulsed turn-on state to the controller 3, the controller 3 may detect the turn-on timing of the second light source 22 based on the received pulsed turn-on state signal.

Turn-off timing information may be used as the turn-on timing information. That is, the turn-on timing in step S2 may be detected using a cycle and a time of the pulsed signal OFF during the pulsed signal ON in the pulsed turn-on control.

Subsequently, in step S3, the controller 3 determines the image capturing timing (cycle and time) of the visible light camera 4 such that the visible light camera 4 performs an image capturing while the second light source 22 is not turned ON, based on the detected turn-on timing of the second light source 22. The visible light camera 4 receives the image capturing control signal including the image capturing timing information from the controller 3, and performs an image capturing based on the received image capturing timing.

Figure 6:
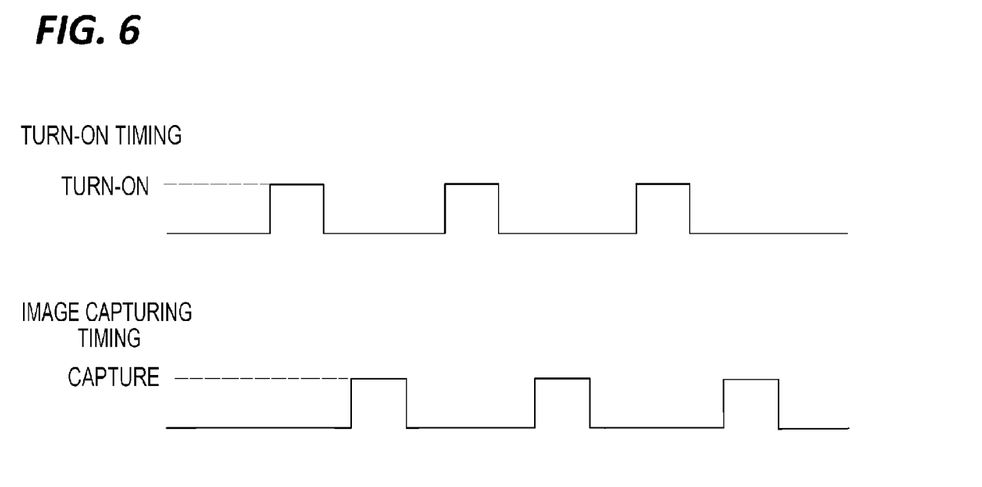
FIG. 6 is a drawing illustrating a turn-on timing of a second light source of the vehicle lamp and an image capturing timing of a visible light camera according to the present embodiment.

FIG. 6 is a drawing illustrating the turn-on timing (upper part of FIG. 6) of the second light source 22 and the image capturing timing (lower part of FIG. 6) of the visible light camera 4. As illustrated in FIG. 6, for example, the controller 3 controls the image capturing timing of the visible light camera 4 so as to capture an image while the second light source 22 is not turned ON.

In step S1 to step S3, the controller 3 confirms whether there is the turn-on operation of the vehicle lamp 1 or not when starting the image capturing operation of the visible light camera 4, and determines the image capturing timing of the visible light camera 4 based on the detected turn-on timing of the second light source, but is not limited thereto. For example, the controller 3 may confirm whether there is the image capturing operation of the visible light camera 4 or not when starting the turn-on operation of the lamp unit 2 by receiving the turn-on instruction signal of the lamp unit 2 from the vehicle controller, and when the visible light camera 4 is performing the image capturing operation, may adjust and determine the image capturing timing of the visible light camera 4 based on a predetermined turn-on timing of the second light source.

Further, in step S3, the controller 3 controls the image capturing timing of the visible light camera 4, but is not limited thereto. Without using the image data captured while the second light source 22 is turned ON among the image data captured by the visible light camera 4, the controller 3 may acquire the vehicle surrounding information based on other image data.

(Modification)

Figure 5:
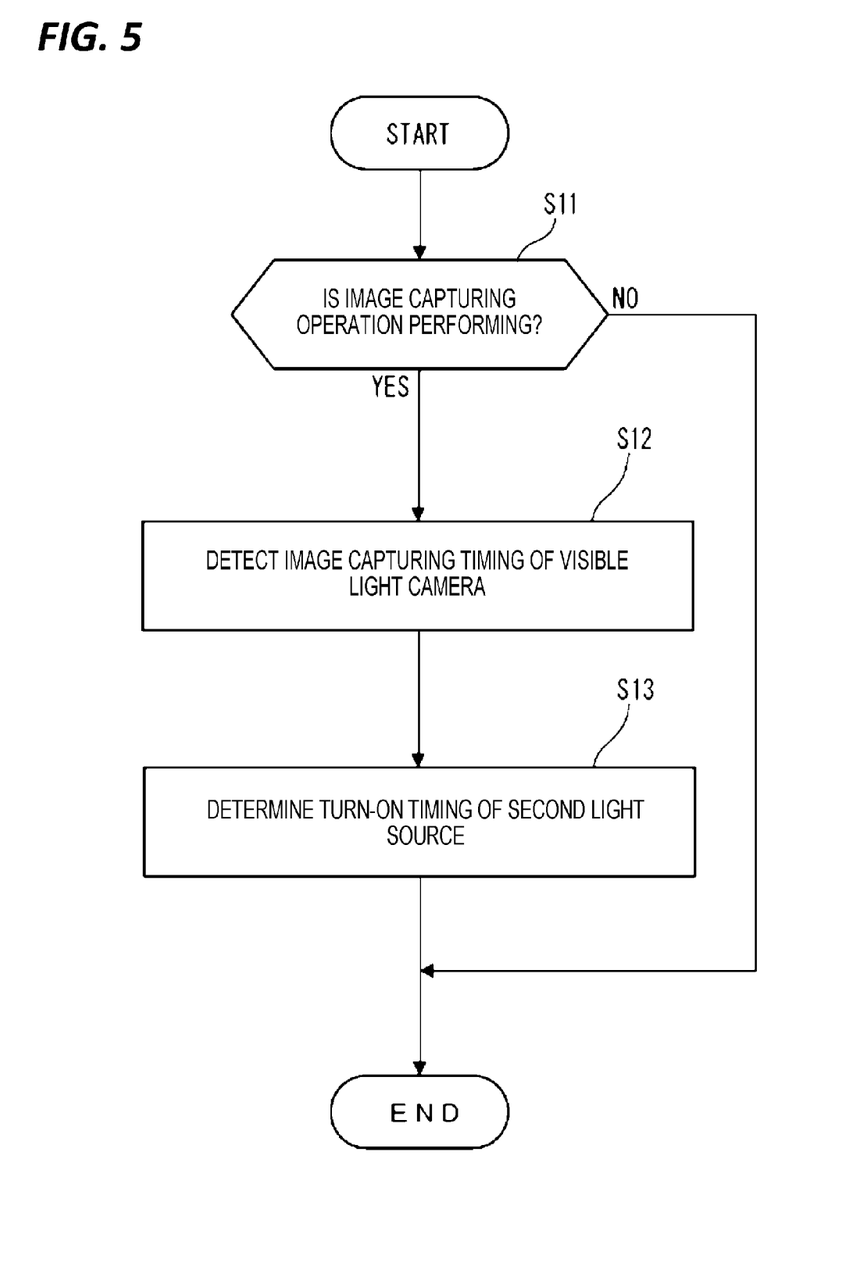
FIG. 5 is a flowchart executed by a controller of a vehicle lamp according to a modification of the present embodiment.

Subsequently, a modification of the operation control of the lamp unit 2 and the visible light camera 4 executed by the controller 3 will be described with reference to FIG. 5. FIG. 5 is a flowchart executed by the controller 3 of the vehicle lamp 1 according to the modification of the present embodiment. The controller 3 of the modification is configured to control the turn-on timing of the second light source 22 of the lamp unit 2 based on the image capturing timing of the visible light camera 4, such that the visible light camera 4 performs an image capturing while only the first light source 21 of the first light source 21 and the second light source 22 is turned ON. Similarly, also in the flowchart, descriptions will be made based on an example in which the first light source 21 is continuously turned ON and the second light source 22 is turned ON in a pulsed manner.

As illustrated in FIG. 5, in step S11, when receiving the turn-on instruction signal of the lamp unit 2 from the vehicle controller, the controller 3 determines whether the visible light camera 4 is performing the image capturing operation. For example, when sending the image capturing control signal to the visible light camera 4, the controller 3 determines that the visible light camera 4 is performing the image capturing operation. The controller 3 may determine whether the visible light camera 4 is performing the image capturing operation or not by receiving the signal related to the operation of the visible light camera 4 from the vehicle controller. When receiving image data from the visible light camera 4, the controller 3 may determine that the visible light camera 4 is performing the image capturing operation. When the determination result in step S11 is NO, the control is ended.

When the determination result in step S11 is YES, the controller 3 detects the image capturing timing (cycle and time of the image capturing) of the visible light camera 4 (step S12). For example, the controller 3 detects the image capturing timing of the visible light camera 4 based on the image capturing timing information included in the image capturing control signal sent to the visible light camera 4.

Subsequently, in step S13, the controller 3 determines the turn-on timing (cycle and time) of the second light source 22 such that the second light source 22 is not turned ON while the visible light camera 4 is capturing, based on the detected image capturing timing of the visible light camera 4. The second light source 22 receives the turn-on control signal including the turn-on timing information from the controller 3, and performs the pulsed turn-on based on the received turn-on timing.

In step S11 to step S13, the controller 3 confirms whether there is the image capturing operation of the visible light camera 4 or not when starting the turn-on operation of the lamp unit 2, and determines the turn-on timing of the second light source 22 based on the detected image capturing timing of the visible light camera 4, but is not limited thereto. For example, the controller 3 may confirm whether there is the turn-on operation of the lamp unit 2 or not when the visible light camera 4 starts the image capturing operation, and may adjust and determine the turn-on timing of the second light source 22 based on a predetermined image capturing timing of the visible light camera 4 when the lamp unit 2 is performing the turn-on operation.

As described above, in the vehicle lamp 1 of the present embodiment, the first light source 21 emits light that forms the diffusion portions PL1 and PH1 of the light distribution patterns PL and PH. The second light source 22 emits light that forms the light condensed portions PL2 and PH2 having luminance higher than that of the diffusion portions PL1 and PH1 The visible light camera 4 captures the periphery (e.g., the front) of the vehicle including the area where the light distribution patterns PL and PH are formed. The controller 3 controls at least one of the turn-on timing of the second light source 22 or the image capturing timing of the visible light camera 4, such that the visible light camera 4 performs an image capturing while only the first light source 21 of the first light source 21 and the second light source 22 is turned ON. For example, the controller 3 controls the image capturing timing of the visible light camera 4 based on the turn-on timing of the second light source 22. Alternatively, the controller 3 controls the turn-on timing of the second light source 22 based on the image capturing timing of the visible light camera 4.

Therefore, in the vehicle lamp 1, the image capturing conditions of the visible light camera 4 may be adjusted in response to the brightness of the first light source 21, and thus, it is possible to capture an image under good image capturing conditions over the entire area of the field angle of the visible light camera 4. Therefore, the vehicle lamp 1 may obtain good image capturing result of the visible light camera 4. For example, it is possible to suppress over exposure or under exposure from occurring in the image capturing result of the visible light camera 4. Further, in the low beam light distribution pattern PL, it is possible to prevent the visible light camera 4 from recognizing the cut off lines CL1 and CL22 in which the light condensed portion PL2 is exists as certain lines in the real world. Further, in the low beam light distribution pattern PL, color blur of the cut off lines CL1 and CL22 that exist in the light condensed portion PL2 is not included in the image capturing data, and thus, the image processing is facilitated.

The lamp unit 2 includes the common optical unit 23 configured to emit the light emitted from the first light source 21 and the second light source 22 toward the periphery (e.g., the front) of the vehicle. Therefore, the lamp unit 2 may be miniaturized. The lamp unit 2 may include a first optical unit corresponding to the first light source 21 and a second optical unit corresponding to the second light source 22, respectively. Therefore, the control of the light distribution area formed by the first light source 21 and the second light source 22 may be independently performed.

In the low beam light distribution pattern PL, the light condensed portion PL2 forms the cut off lines CL1 and CL22 at the center portion of the low beam light distribution pattern PL, and the diffusion portion PL1 is positioned lower than the cut off lines CL1 and CL22 of the light condensed portion PL2. For example, it is possible to prevent the visible light camera 4 from recognizing the cut off lines CL1 and CL22 in which the light condensed portion PL2 is exists as certain lines in the real world, by performing the image capturing by the visible light camera 4 while only the diffusion portion PL1 is formed. Further, the color blur of the cut off lines CL1 and CL22 that exist in the light condensed portion PL2 is not included in the image capturing data, and thus, the image processing is facilitated.

In the high beam light distribution pattern PH, the light condensed portion PH2 is narrower than the diffusion portion PH1, and overlapped with the diffusion portion PH1.

For example, it is possible to suppress over exposure or under exposure from occurring in the image capturing result of the visible light camera 4 by performing the image capturing by the visible light camera 4 while only the diffusion portion PH1 is formed.

In the above described embodiment, the vehicle headlamp that irradiates the front of the vehicle has been described as an example of the vehicle lamp 1, but the vehicle lamp 1 is not limited thereto. The vehicle lamp 1 may be a lamp that irradiates the side or the rear of the vehicle.

Further, in the above described embodiment, the example in which the vehicle monitoring system of the present disclosure is configured by the vehicle lamp 1 has been described, but the present disclosure is not limited thereto. For example, the visible light camera 4 may be disposed outside the vehicle lamp 1. In this case, the controller 3 may be configured by only an electronic control unit configured to control the operation of the lamp unit 2, and a controller configured to the operation of the visible light camera 4 may be separately disposed outside the vehicle lamp 1. In this case, the controller configured to control the operation of the visible light camera 4 may be integrally configured with the vehicle controller.

Further, in the above described embodiment, when driving at night, the visible light camera 4 captures the front of the vehicle using the light from the lamp unit 2, by the present disclosure is not limited thereto. The visible light camera 4 may capture the front of the vehicle using the light from the lamp unit 2 even in a case where the image capturing data having good luminance cannot be obtained because the periphery of the vehicle is dark, such as when driving in a tunnel.

Further, in the above described embodiment, the second light source 22 is turned ON in a pulsed manner, but is not limited thereto. The second light source 22 may be continuously turned ON. In this case, the controller 3 regularly stops the continuous turn-on of the second light source 22 or switches to the pulsed turn-on, so as to control the image capturing timing of the visible light camera 4 such that the visible light camera 4 performs an image capturing while the second light source 22 is not turned ON.

Further, in the above described embodiment, the first light source 21 is continuously turned ON, but is not limited thereto. The first light source 21 may be turned on in a pulsed manner. In this case, the controller 3 controls the image capturing timing of the visible light camera 4 such that the visible light camera 4 performs an image capturing while the first light source 21 is turned ON.

Further, in the above described embodiment, the turn-on timing of the second light source 22 or the image capturing timing of the visible light camera 4 is controlled, but the present disclosure is not limited thereto. Both the turn-on timing of the second light source 22 and the image capturing timing of the visible light camera 4 may be controlled so as to adjust each other.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle monitoring system comprising:
    a lamp including a first light source configured to emit light that forms a first light distribution area on a virtual vertical screen disposed at a predetermined distance from a vehicle, and a second light source configured to emit light that forms a second light distribution area having a luminance higher than that of the first light distribution area on the virtual vertical screen, the first light distribution area and the second light distribution area being combined to form a predetermined light distribution pattern on the virtual vertical screen;
    a visible light camera configured to capture a periphery of the vehicle including an area where the light distribution pattern is formed; and
    a controller configured to control at least one of an emission timing of the second light source or an image capturing timing of the visible light camera such that the visible light camera performs an image capturing while only the first light source emits light.

2. The vehicle monitoring system according to claim 1, wherein the controller controls the image capturing timing of the visible light camera based on the emission timing of the second light source.

3. The vehicle monitoring system according to claim 2, wherein the lamp includes an optical unit configured to emit light emitted from the first light source and the second light source toward an outside of the vehicle.

4. The vehicle monitoring system according to claim 2, wherein the lamp includes:
    a first optical unit configured to emit light emitted from the first light source toward an outside of the vehicle; and
    a second optical unit configured to emit light emitted from the second light source toward an outside of the vehicle.

5. The vehicle monitoring system according to claim 2, wherein the light distribution pattern is a low beam light distribution pattern including a cut-off line,
    the second light distribution area is at least partially overlapped with the first light distribution area,
    the second light distribution area forms a cut-off line at a center portion of the light distribution pattern, and
    the first light distribution area is an area positioned below the cut-off line of the second light distribution area.

6. The vehicle monitoring system according to claim 2, wherein the light distribution pattern is a high beam light distribution pattern, and
    the second light distribution area is narrower than the first light distribution area and overlapped with the first light distribution area.

7. The vehicle monitoring system according to claim 1, wherein the controller controls the emission timing of the second light source based on the image capturing timing of the visible light camera.

8. The vehicle monitoring system according to claim 7, wherein the lamp includes an optical unit configured to emit light emitted from the first light source and the second light source toward an outside of the vehicle.

9. The vehicle monitoring system according to claim 7, wherein the lamp includes:
    a first optical unit configured to emit light emitted from the first light source toward an outside of the vehicle; and
    a second optical unit configured to emit light emitted from the second light source toward an outside of the vehicle.

10. The vehicle monitoring system according to claim 7, wherein the light distribution pattern is a low beam light distribution pattern including a cut-off line, the second light distribution area is at least partially overlapped with the first light distribution area, the second light distribution area forms a cut-off line at a center portion of the light distribution pattern, and the first light distribution area is an area positioned below the cut-off line of the second light distribution area.

11. The vehicle monitoring system according to claim 7, wherein the light distribution pattern is a high beam light distribution pattern, and the second light distribution area is narrower than the first light distribution area and overlapped with the first light distribution area.

12. The vehicle monitoring system according to claim 1, wherein the lamp includes an optical unit configured to emit light emitted from the first light source and the second light source toward an outside of the vehicle.

13. The vehicle monitoring system according to claim 12, wherein the light distribution pattern is a low beam light distribution pattern including a cut-off line, the second light distribution area is at least partially overlapped with the first light distribution area, the second light distribution area forms a cut-off line at a center portion of the light distribution pattern, and the first light distribution area is an area positioned below the cut-off line of the second light distribution area.

14. The vehicle monitoring system according to claim 12, wherein the light distribution pattern is a high beam light distribution pattern, and the second light distribution area is narrower than the first light distribution area and overlapped with the first light distribution area.

15. The vehicle monitoring system according to claim 1, wherein the lamp includes:

a first optical unit configured to emit light emitted from the first light source toward an outside of the vehicle; and a second optical unit configured to emit light emitted from the second light source toward an outside of the vehicle.

16. The vehicle monitoring system according to claim 15, wherein the light distribution pattern is a low beam light distribution pattern including a cut-off line, the second light distribution area is at least partially overlapped with the first light distribution area, the second light distribution area forms a cut-off line at a center portion of the light distribution pattern, and the first light distribution area is an area positioned below the cut-off line of the second light distribution area.

17. The vehicle monitoring system according to claim 15, wherein the light distribution pattern is a high beam light distribution pattern, and the second light distribution area is narrower than the first light distribution area and overlapped with the first light distribution area.

18. The vehicle monitoring system according to claim 1, wherein the light distribution pattern is a low beam light distribution pattern including a cut-off line, the second light distribution area is at least partially overlapped with the first light distribution area, the second light distribution area forms a cut-off line at a center portion of the light distribution pattern, and the first light distribution area is an area positioned below the cut-off line of the second light distribution area.

19. The vehicle monitoring system according to claim 1, wherein the light distribution pattern is a high beam light distribution pattern, and the second light distribution area is narrower than the first light distribution area and overlapped with the first light distribution area.

* * * * *